United States Patent
Kuscher et al.

(10) Patent No.: US 9,641,590 B2
(45) Date of Patent: May 2, 2017

(54) RESUMING SESSION STATES

(71) Applicant: Google Inc., Mountain View, CA (US)

(72) Inventors: Alexander Friedrich Kuscher, San Francisco, CA (US); Albert Scott Bodenhamer, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 247 days.

(21) Appl. No.: 14/470,899

(22) Filed: Aug. 27, 2014

(65) Prior Publication Data

US 2016/0063131 A1 Mar. 3, 2016

(51) Int. Cl.
*G06F 17/00* (2006.01)
*H04L 29/08* (2006.01)
*G06F 9/445* (2006.01)
*G06F 17/30* (2006.01)
*H04L 29/06* (2006.01)
*G06F 9/44* (2006.01)
*G06F 17/22* (2006.01)

(52) U.S. Cl.
CPC ........... *H04L 67/02* (2013.01); *G06F 8/65* (2013.01); *G06F 17/30899* (2013.01); *H04L 67/142* (2013.01); *G06F 9/4443* (2013.01); *G06F 17/2247* (2013.01); *G06F 17/30861* (2013.01); *G06F 17/30873* (2013.01); *G06F 17/30902* (2013.01); *G06F 17/30905* (2013.01); *H04L 67/42* (2013.01)

(58) Field of Classification Search
CPC .......... G06F 17/2247; G06F 17/30899; G06F 17/30905; G06F 17/30873; G06F 17/30861; G06F 9/4443; G06F 17/30902; H04L 67/02; H04L 67/42

USPC ......................... 715/200–208, 229, 234–239
See application file for complete search history.

(56) References Cited

U.S. PATENT DOCUMENTS

| 7,953,861 | B2 | 5/2011 | Yardley |
| 8,082,227 | B2 | 12/2011 | Balakrishnan et al. |
| 2003/0233361 | A1 | 12/2003 | Cady |
| 2004/0044721 | A1 | 3/2004 | Song et al. |

(Continued)

FOREIGN PATENT DOCUMENTS

WO  WO 2012/148692 A1  11/2012

OTHER PUBLICATIONS

Mozilla Support—Restore previous session, retrieved from <https://support.mozilla.org/en-US/kb/restore-previous-session>, 2014.

*Primary Examiner* — Quoc A Tran
(74) *Attorney, Agent, or Firm* — McDermott Will & Emery LLP

(57) ABSTRACT

Providing state information to a server includes accessing a document object model (DOM) for a web application, the DOM corresponding to a tree structure which represents a first state of the web application. An indication of the first state of the web application is provided to a server based on the DOM. A determination is made that a predetermined event has occurred at the system, the predetermined event indicating that a second state of the web application, different than the first state of the web application, is to be provided to the server. In response to the determination, an indication of the second state of the web application, corresponding to an updated version of the DOM, is provided to the server.

21 Claims, 5 Drawing Sheets

(56) References Cited

U.S. PATENT DOCUMENTS

| | | |
|---|---|---|
| 2005/0066037 A1 | 3/2005 | Song et al. |
| 2005/0198365 A1* | 9/2005 | Wei .................... G06F 17/2247 709/237 |
| 2006/0075088 A1* | 4/2006 | Guo ........................ H04L 67/02 709/224 |
| 2009/0055542 A1 | 2/2009 | Zhao et al. |
| 2010/0174774 A1 | 7/2010 | Kern et al. |
| 2011/0252300 A1* | 10/2011 | Lloyd ................... G06F 17/246 715/217 |
| 2012/0166518 A1 | 6/2012 | Alev et al. |
| 2013/0041790 A1 | 2/2013 | Murugesan et al. |

\* cited by examiner

| Alphabetical order | Time: | Activity | Date | Application |
|---|---|---|---|---|
| -session I | 7:00 am | Editing | 1/1/2014 | E-mail |
| -Serssion II | 10:00 pm | Gaming | 1/12/2014 | Online Game |
| -session III | 3:00am | Browsing | 1/17/2014 | online search engine |
| -session IV | 5:30 pm | Editing | 02/10/2014 | online Documents app |
| . | . | . | . | . |
| . | . | . | . | . |
| . | . | . | . | . |

312 — Alphabetical order
314 — Time
316 — Activity
318 — Date
320 — Application
300

FIG. 3

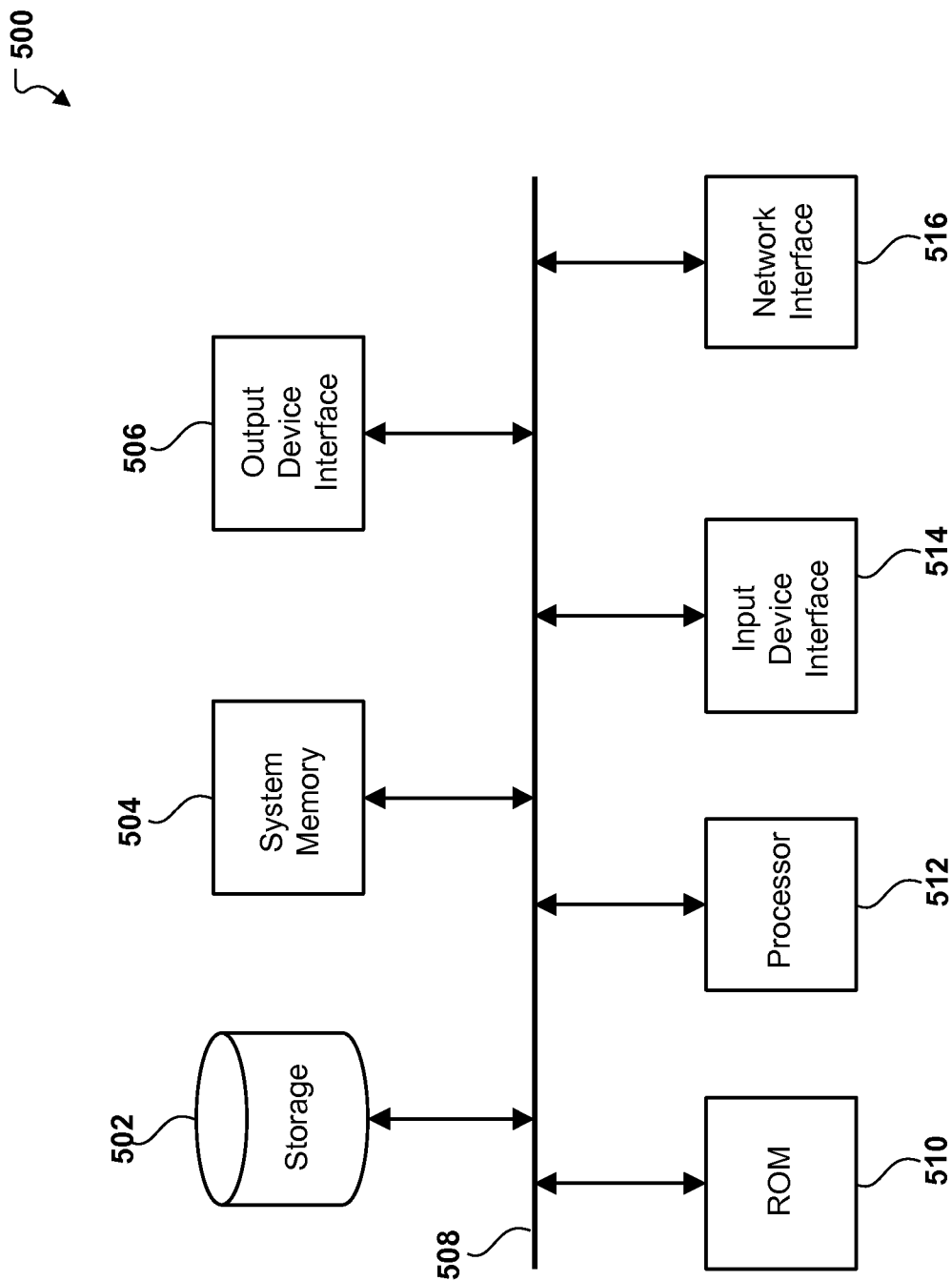

RESUMING SESSION STATES

BACKGROUND

The present disclosure generally relates to session states and, in particular, to providing session state information to a server.

Computing today is generally dependent on links between physical devices. For example, data can be lost when a user device is misplaced or becomes inoperable. In addition, moving states between different devices can be cumbersome or unintuitive for a user.

SUMMARY

The disclosed subject matter relates to a system providing state information to a server. The computer system comprises one or more processors, and a machine-readable medium including instructions stored therein, which when executed by the processors cause the processors to perform operations comprising accessing a document object model (DOM) for a web application, the DOM corresponding to a tree structure which represents a first state of the web application, and providing, to a server, an indication of the first state of the web application based on the DOM. The operations further comprise determining that a predetermined event has occurred at the system, the predetermined event indicating that a second state of the web application, different than the first state of the web application, is to be provided to the server, and providing, to the server and in response to the determination, an indication of the second state of the web application, corresponding to an updated version of the DOM.

The disclosed subject matter also relates to a machine-readable medium comprising instructions stored therein, which when executed by a system, cause the system to perform operations comprising accessing a document object model (DOM) for a web application, the DOM corresponding to a tree structure which represents a first state of the web application, and providing, to a server, an indication of the first state of the web application based on the DOM. The operations further comprise determining that a predetermined event has occurred at the system, the predetermined event indicating that a second state of the web application, different than the first state of the web application, is to be provided to the server, and providing, to the server and in response to the determination, an indication of the second state of the web application, corresponding to an updated version of the DOM. In addition, the operations comprise determining state information of the system, the state information comprising at least one of window location data, scrolling position data, folder creation data, application position data, open window information, minimized window information, and display settings information, and providing, to the server, an indication of the determined state information, for subsequent retrieval from the server.

The disclosed subject matter further relates to a system for providing session states to a server. The system comprises one or more processors, and a machine-readable medium comprising instructions stored therein, which when executed by the processors, cause the processors to perform operations comprising determining that a first predetermined event has occurred with respect to one or more applications running on the system, the first predetermined event indicating that a first session state for the one or more applications is to be provided to the server. The operations further comprise sending, to the server, and in response to determining that the first predetermined event has occurred, the first session state for the one or more applications, and determining that a second predetermined event has occurred with respect to the one or more applications, the second predetermined event indicating that a second session state for the one or more applications is to be provided to the server. In addition, the operations comprise sending, to the server and in response to determining that the second predetermined event has occurred, the second session state for the one or more applications, and providing, to the server, contextual information for each of the first session state and the second session state, the contextual information for providing a user with context to differentiate the first session state from the second session state.

The disclosed subject matter further relates to a machine-readable medium comprising instructions stored therein, which when executed by a system, cause the system to perform operations comprising determining that a first predetermined event has occurred with respect to one or more applications running on the system, the first predetermined event indicating that a first session state for the one or more applications is to be provided to the server. The operations further comprise sending, to the server, and in response to determining that the first predetermined event has occurred, the first session state for the one or more applications, and determining that a second predetermined event has occurred with respect to the one or more applications, the second predetermined event indicating that a second session state for the one or more applications is to be provided to the server. The operations further comprise sending, to the server and in response to determining that the second predetermined event has occurred, the second session state for the one or more applications, providing, to the server, contextual information for each of the first session state and the second session state, the contextual information for providing a user with context to differentiate the first session state from the second session state, and sending, to the server, a request to retrieve a prior session. In addition, the operations comprise receiving, from the server and in response to the sending, the contextual information for the first session state and the second session state, receiving, in response to the received contextual information, user selection of the first session state or the second session state and receiving, from the server, the first session state or the second session state based on the received user selection.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

FIG. 3 illustrates an example user interface with contextual information for different session states, according to aspects of the technology.

FIG. 5 conceptually illustrates an electronic system with which some implementations of the subject technology are implemented.

DETAILED DESCRIPTION

Figure 1:
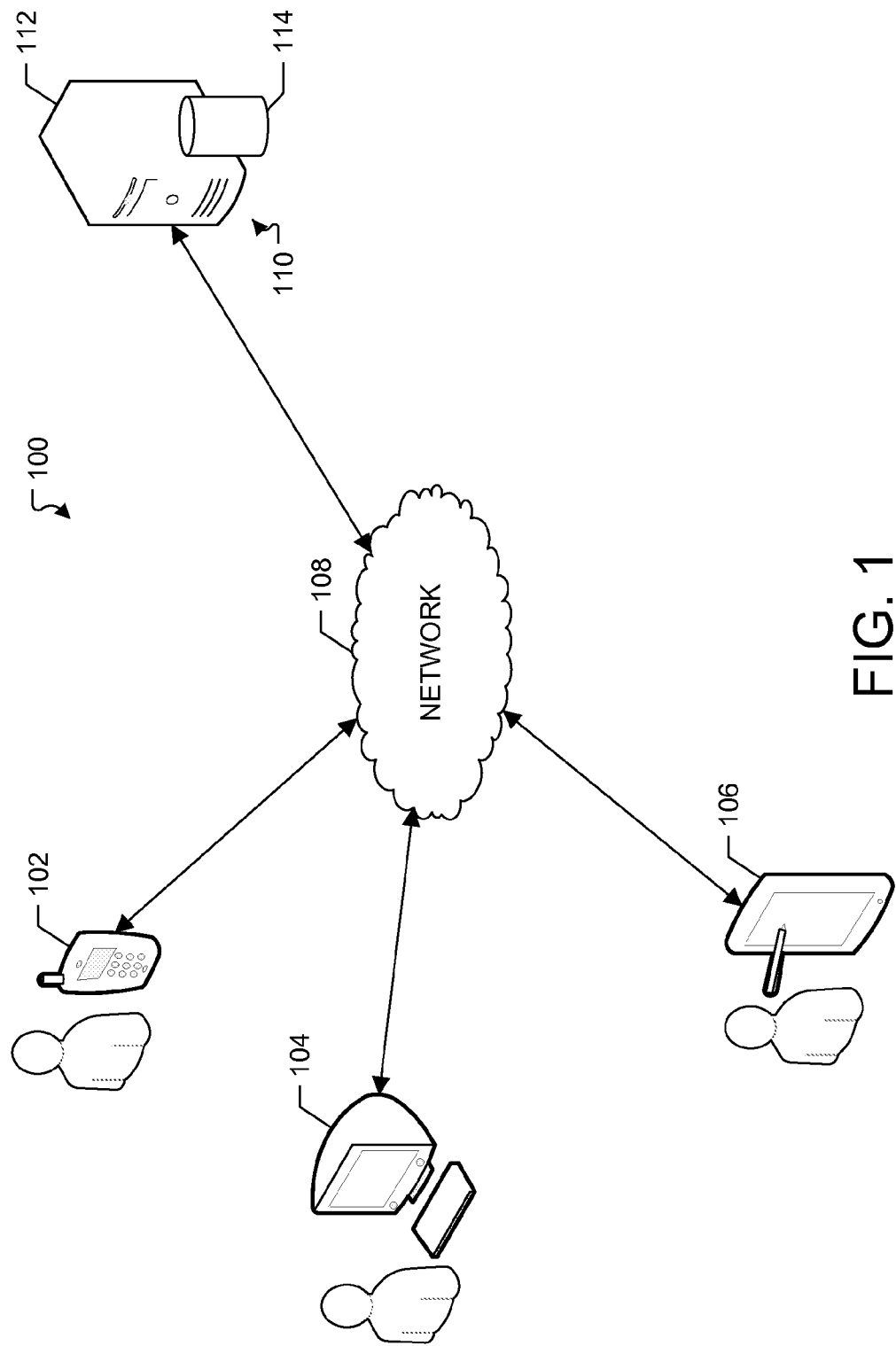
FIG. 1 illustrates an example network environment in which session state information is provided to a server.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown at block diagram form in order to avoid obscuring the concepts of the subject technology.

As noted above, computing today is generally dependent on links between physical devices. For example, data can be lost when a user device is misplaced or becomes inoperable. In addition, moving states between different devices can be cumbersome or unintuitive for a user.

In general, state information includes, but is not limited to, window location and position defined by co-ordinates (e.g., x,y,z coordinates), the scrolling bar position of the window and within applications, open window or minimized window status for browsers or applications, display settings, active tab information, as well as all tabs within a window, or folders created with application launchers. In addition to the above, state information includes a document object model (DOM) for a web application.

A DOM corresponds to a tree structure that represents the current state of a web application. The document object model (DOM) is a cross-platform and language-independent convention for representing and interacting with objects in web application documents. Objects in the DOM tree may be addressed and manipulated by using methods on the objects. The state of a web application can be completely represented by its DOM and, saving the DOM for later retrieval allows a complete (or substantially complete) reproduction of the web application from the moment it was saved.

In this regard, the subject disclosure provides for providing state information to a server. A DOM for a web application is accessed, the DOM corresponding to a tree structure which represents a first state of the web application. An indication of the first state of the web application is provided to a server based on the DOM, and a determination is made that a predetermined event has occurred at the system, the predetermined event indicating that a second state of the web application, different than the first state of the web application, is to be provided to the server. In response to the determination, an indication of the second state of the web application is provided to the based on an updated version of the DOM. In example aspects, the subject disclosure provides for determining additional state information (e.g., window location and position defined by co-ordinates, the scrolling bar position of the window and within applications, open window or minimized window status for browsers or applications, display settings, active tab information, as well as all tabs within a window, or folders created with application launchers), and providing an indication of the additional state information to the server.

The subject disclosure further relates to presenting a user with representations (e.g., via a user interface) of different session states, for example, corresponding to prior sessions in which the user was engaged. The user can select a session state from multiple prior session states. In response to that selection, a computing device of the user can restore the session information associated with that session state. However, in order to provide the user with sufficient information for each of the prior sessions, it may be desirable to present the user with contextual information associated with the prior sessions. Further, when engaged in a current session, it may be desirable for the computing device to determine at which point to determine when a new session for storing to a server is to be triggered.

In this regard, the subject disclosure also provides for providing session states to a server. A determination is made that a first predetermined event has occurred with respect to one or more applications running on the system, the first predetermined event indicating that a first session state for the one or more applications is to be provided to the server. In response to determining that the first predetermined event has occurred, the first session state for the one or more applications is sent to the server. A determination is made that a second predetermined event has occurred with respect to the one or more applications, the second predetermined event indicating that a second session state for the one or more applications is to be provided to the server. In response to determining that the second predetermined event has occurred, the second session state for the one or more applications is sent to the server. In addition, contextual information for each of the first session state and the second session state is provided to the server, the contextual information for providing a user with context to differentiate the first session state from the second session state.

FIG. 1 illustrates an example network environment 100 in which session state information is provided to a server 112. A network environment 100 includes computing devices 102, 104 and 106 (hereinafter "102-106") and computing system 110. Computing devices 102-106 and computing system 110 can communicate with each other through a network 108. Computing system 110 can include one or more computing devices 112 (e.g., one or more servers), and one or more computer-readable storage devices 114 (e.g., one or more databases).

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, a synchronization server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver In some aspects, network environment 100 can be a distributed client/server system that spans one or more networks, for example, network 108.

Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection.

In example aspects, a computing device (e.g., any of computing devices 102-106) accesses a DOM for a web application (e.g., shown within a browser of the computing device), the DOM corresponding to a tree structure which represents a first state of the web application. The computing device provides an indication of the first state of the web application based on the DOM to a server (e.g., server 110). The computing device determines that a predetermined event has occurred at the device, the predetermined event indicating that a second state of the web application, different than the first state of the web application, is to be provided to the server. The computing device provides, to the server and in response to the determination, an indication of the second state of the web application, corresponding to an updated version of the DOM.

In other example aspects, a computing device (e.g., any of computing devices 102-106) determines that a first predetermined event has occurred with respect to one or more applications running on the device, the first predetermined event indicating that a first session state for the one or more applications is to be provided to a server (e.g., server 110). The computing device sends, to the server, and in response to determining that the first predetermined event has occurred, the first session state for the one or more applications. The computing device determines that a second predetermined event has occurred with respect to the one or more applications, the second predetermined event indicating that a second session state for the one or more applications is to be provided to the server. The computing device sends, to the server and in response to determining that the second predetermined event has occurred, the second session state for the one or more applications, and provides, to the server, contextual information for each of the first session state and the second session state, the contextual information for providing a user with context to differentiate the first session state from the second session state.

Thus, it is possible to save a DOM state of a web application or to save session state information and contextual information in response to determining one or more predetermined events. Alternatively or in addition, it is possible to save other state information for applications. As noted above, this state information includes, but is not limited to, window location and position defined by coordinates (e.g., x,y,z coordinates), the scrolling bar position of the window and within applications, open window or minimized window status for browsers or applications, display settings, active tab information, as well as all tabs within a window, or folders created with application launchers.

It is therefore possible to reduce or eliminate a user's dependency on one physical device when it comes to saving the state of a user activity on that device. The user is allowed to save his current state and to resume from the same device where the state was saved, or from a different device for that same state, such that the device disposable but data is not. The subject disclosure allows for a complete, or substantially complete, backup of the state of the device by saving the information state and state sessions (e.g., in a cloud based server), with the option of retrieving the state for a seamless resumption of activity of that state from the last moment it was saved. In some aspects, the subject disclosure backs-up to a server a frozen image of a certain state, representing a user's activity related to that state, with the option of retrieving that state at any time from any device and providing a replica from when the state was last saved.

Figure 2:
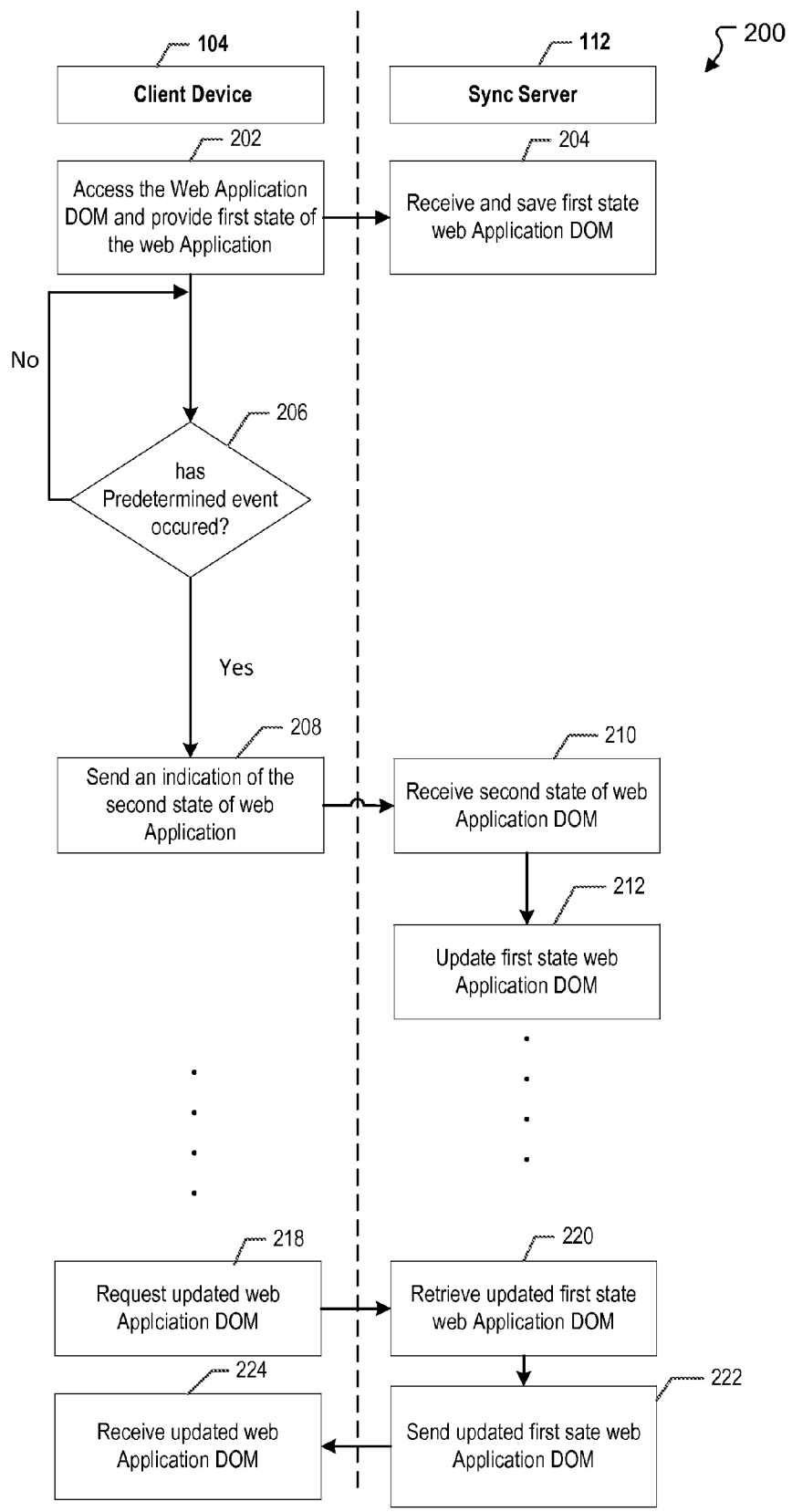
FIG. 2 illustrates an example process of a client device providing session state information to a server, according to aspects of the technology.

FIG. 2 illustrates an example process 200 of a client device providing session state information to a server, according to aspects of the technology. For explanatory purposes, the blocks of the example process 200 are described herein as occurring in serial, or linearly. However, multiple blocks of the example process 200 may occur in parallel. In addition, the blocks of the example process 200 may be performed a different order than the order shown and/or one or more of the blocks of the example process 200 may not be performed. Further, while process 200 is discussed with reference to the systems in FIG. 1, it should be noted that process 200 is not limited to such and can apply to different systems and configurations.

In the example process 200, the client device (e.g., any of 102-106) accesses the web application DOM and provides the first state of the web application to the server 112 at block 202. The server receives the first state web application DOM at block 204 from the client device and saves the first state DOM for later retrieval or further computations. In example aspects, the first state of the DOM provided at block 204 represents an entirety of the DOM. Accessing and saving the entirety of the DOM of a web application provides a manner for retrieving the state of the web application at a later stage.

A set of predetermined events is checked at block 206 by the client device (e.g., any of 102-106). The first predetermined events are predefined conditions to be tested. For example, the predetermined event may be a specific period of time that has elapsed since the time the first state of the DOM was saved (e.g., 5 minutes since saving the first state).

Alternatively or in addition, the predetermined event may be related to the level of network resources availability, for example, where the network resources availability is below a threshold availability level. For example if there is light traffic on the network, this may be a good opportunity to test for saving a second state of the DOM. Furthermore, a predetermined event may be triggered by tracking changes to the DOM where there is a threshold amount of accumulated change in the DOM (e.g., a 10%, 25%, 50% change).

In some aspects, in the event that the predetermined event is passage of a predetermined period of time, the client device (e.g., any of 102-106), captures a second state of the DOM and provides an indication of the second state to the server 112. The indication of the second state may be the difference between the first state of the DOM and second state of the DOM. In this event, the difference between the second state of the DOM and the first state of the DOM does not necessarily need to meet a threshold delta for change between the first state of the DOM and the second state of the DOM.

In the event that the predetermined event is availability of network resources, meaning there is low enough high traffic on the network to indicate an availability of bandwidth for the device to take a second state of the DOM, the client device (e.g., any of 102-106) captures a second state of the DOM and provides an indication of the second state to the server 112. The indication of the second state may be the difference between the first state of the DOM and second state of the DOM. In this event, the difference between the second state of the DOM and the first state of the DOM does not necessarily needs to meet a threshold delta for significant change between the first state of the DOM and the second state of the DOM.

As noted above, in the cases where the predetermined event corresponds to passage of a predetermined period of time and/or availability of network resources, the difference between the first state of the DOM and the second state does not necessarily need to meet a threshold to send an indication of the second state to the server 112. This provides the added flexibility of not providing a second state to the server, when there is lack of network resources in the event a predetermined event has occurred at the same time and little to no changes is detected between the first state of the DOM and the second state of the DOM.

Additionally, the predetermined event may be a threshold amount of accumulated within the DOM, meaning the change between the first state of the DOM and the second state of the DOM meets a preset threshold (e.g., corresponding to significant change in the DOM). In that event, the client device (e.g., any of 102-106) captures a second state of the DOM, and provides an indication of the second state of the DOM to the server 112 as shown in block 208. In the event the predetermined event has not occurred at decision block 206, the system awaits until a predetermined event has occurred In some aspects, the second state of the DOM provided to the server at block 210 represents the calculated delta between the first state and the second state. The server 112 receives an indication of the second state of the web application DOM and updates the first state web application DOM according to the indication of the second state of the DOM received at block 212. In some aspects, the server 112 in the case it has no resources to process the second state immediately, may save the second state for later processing alongside the first state of the DOM. The server 112 may later update the first state of the DOM with the information provided on the indication of the second state and save the first state as an updated version of the first state. The server may keep versions of the first state and the indication of the second state as they are provided, or may delete the indication of the second state and the first state after updating the first state and only keep the updated version of the first state as the current state of the web application to be provided upon request. The latter may be more efficient, since keeping versions of earlier states might require more memory resources.

In example aspects, the client device (e.g., any of 102-106) may request from the server the updated state web application DOM at block 218. In response to the request, the server 112 retrieves (e.g, from memory) the updated state web application DOM at block 220 and sends the updated version of the first state to the client device at block 222. The client device receives the updated state of the web application at block 224 for use within the device. Furthermore, the DOM generated at the server 112 as at block 220 may include the entire updated version of the DOM. The DOM state of a web application at block 202 may correspond to a current JavaScript state of the web application and may be accessed from the RAM of the system.

FIG. 3 illustrates an example user interface 300 with contextual information for different session states according to aspects of the technology. Contextual information may be, but not limited to, the time of the sessions 314, the nature of the activity within the session 316, the date the sessions took place 318, the application 320 used during that session and a session name 312 (e.g., that maybe arranged alphabetically) to sort out the different state sessions. In one or more implementations, the contextual information may include a screenshot for each of the first session state and the second session state. Contextual information may further include an indication of web resources being accessed by the first session state and the second session state.

In some aspects, the time of sessions 314 may be indicated as the time when the session has begun and/or the time when the session has ended, the time entries for sessions maybe stored, in response to user request, in memory in chronological or reverse chronological order, allowing the user to more easily identify which session state to restore from the multiple sessions states in 300.

The nature of the activity of the session 316 is an alternative way to arrange the session states of the device. The user may choose to store the session based on the activity related to the session. For example, the activity may be classified as editing an online document using a cloud based service or using an application for editing on the client device (e.g., any of 102-106). Another example for an activity of a session may be playing a game online or using an application on the client device. Furthermore, activity may be browsing online contents or surfing the web using a web application browser for example.

In some aspects, the session state may be arranged based the date 318 the session took place. The date of the activity provides another alternative to define a session state, in one or more implementations, the date of the activity may be grouped by weeks, months or years. The user can be provided, for example, with search session states of activity accrued for a certain month within a given year. In example aspects, a user may be provided with interfaces to select how far may a user go back in time to retrieve a session state.

Alternatively or in addition, the application used during a session state 320 may provide for a means to arrange state sessions. For example, an application may be a word file editing application, an online game application, an e-mail provider, or an online documents application. In the event the different applications were running in association with a session state, the session state may be saved with two entries, one entry for each application. The state sessions may further be saved by providing the user an option to save the session state and assign a name specified by the user, where the names of the session states are may be arranged in alphabetical order. This can provide the user with the option to choose the session state from an alphabetical order list of the session states.

In some aspects, the client device (e.g., any of 102-106) access a list of contextual information related to his activity within the device, where the contextual information (e.g., 312-320) provides the user with a means to search for a previous session state related to his activity in different categorizations. This provides more flexibility in selecting a session state and the ability to differentiate between multiple sessions and to select a session state to retrieve based on the session state contextual information. Once the user chooses a session state based on the contextual information, the client device (e.g., any of 102-106) sends the server a request for the chosen session state to be retrieved from the server and passed on to the client device.

In some aspects, the user may be given an option on how to save the session state and based on which contextual information. For example, the user may be given the option to arrange and save the session by date only (e.g., if specified by the user). Alternatively, a default setting for all the above stated contextual information or a subset of the contextual information (312-320) may be applied by the client device (e.g., any of 102-106).

Figure 4:
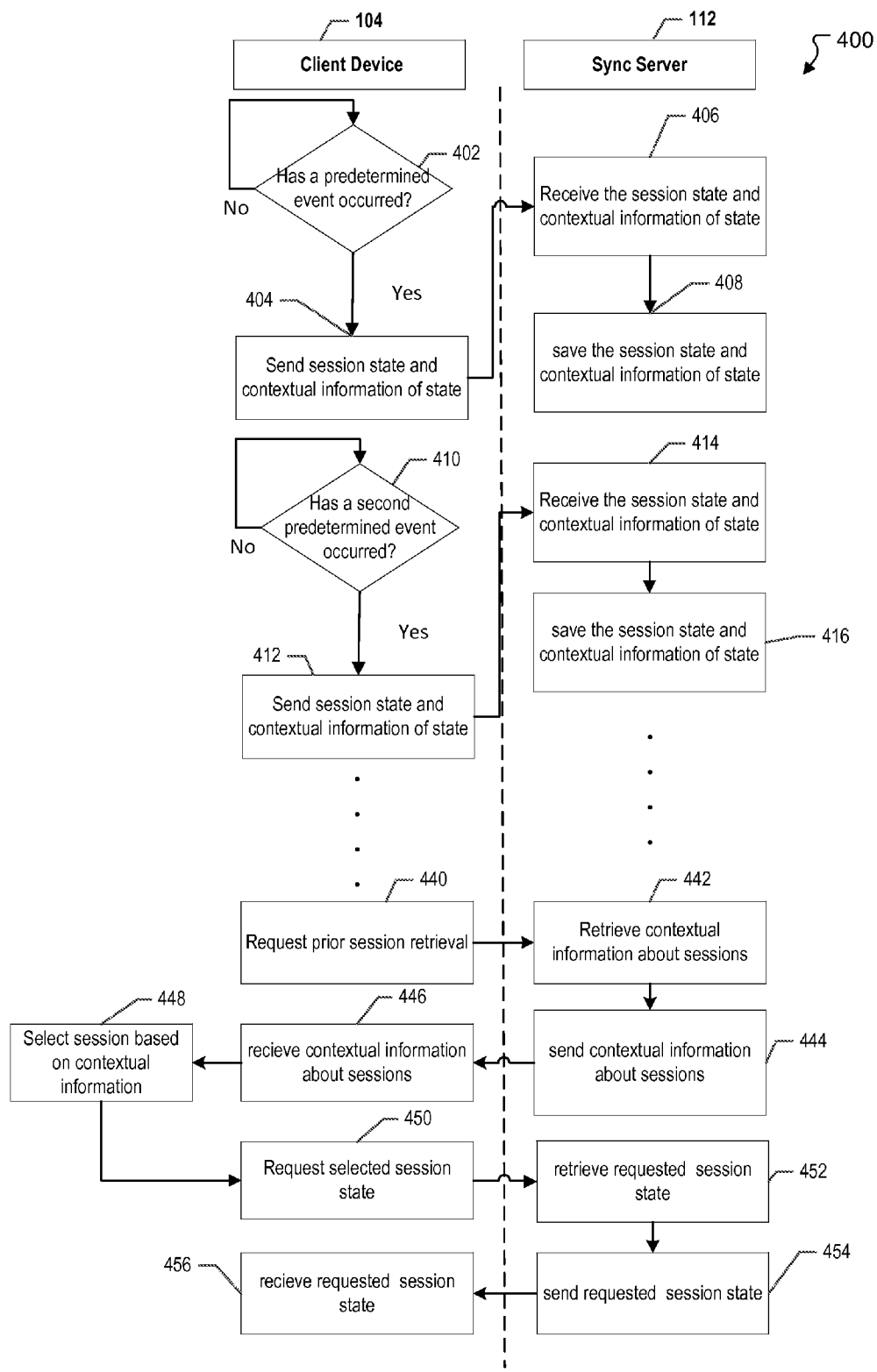
FIG. 4 illustrates an example process of a client device providing session to a server, according to aspects of the technology.

FIG. 4 illustrates example process 400 of a client device (e.g., any of 102-106) providing session to a server according to aspects of the technology. For explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed. Further, while process 400 is discussed with reference to the systems in FIG. 1, it should be noted that process 400 is not limited to such and can apply to different systems and configurations.

In the example process 400, the client device (e.g., any of 102-106) checks for the occurrence of a predetermined event at block 402. The predetermined events are predefined conditions to be tested by the client device. For example, the predetermined event may be detecting that one or more of the following have occurred: a user has logged out of the system, the user has logged out of one or more of the applications running within the system, a different user has logged into the client device, a period of inactivity for a predetermined threshold time period for one or more of the applications running within the system, a new type of activity (e.g., opening a new application) that was not previously running, or a switch in activity by the user to a different session (e.g., the switched-to session may be a new session state or a pre-saved session state retrieved from the server 112).

In the case a predetermined event related to a session state has occurred, the session state is saved and sent along with its contextual information at block 404 by the client device (e.g., any of 102-106) to the server 112. The session state may include the DOM of all running web applications, window location and position defined by its (x,y,z) coordinates for example, the scrolling bar position of the window and within applications, open window or minimized window status for browsers or applications, display settings, active tab information, as well as all tabs within a window, or folders created with application launchers. The contextual information may be the time the session state began, the nature of the activity within the session, the date the session took place, and/or the application used during that session.

The server 112 in return receives the session state and the contextual information of the session state at block 406 and saves the session and the contextual information for later retrieval at block 408. At block 402, in the case no predetermined event has occurred, the client device (e.g., any of 102-106) keeps checking for the occurrence of a predetermined event, until the check is positive for occurrence of at least a predetermined event.

Furthermore, the client device (e.g., any of 102-106) checks for a second predetermined event occurrence at block 410. The second predetermined events are predefined conditions to be tested by the client device (e.g., any of 102-106), for example the second predetermined events may be the same set as the first predetermined events, a subset of the first predetermined events, or subset of the first predetermined events with additional predetermined events. The predetermined event may be detecting that one or more of the following have occurred: a user has logged out of the system, the user has logged out of one or more of the applications running within the system, a different user has logged into the client device, a period of inactivity for a predetermined threshold time period for one or more of the applications running within the system, a new type of activity (e.g., opening a new application) that was not previously running, or a switch in activity by the user to a different session (e.g., the switched-to session may be a new session state or a pre-saved session state retrieved from the server 112).

In the case a second predetermined event has occurred, the client device (e.g., any of 102-106) sends the session state along with its contextual information at block 412 to the server 112. The server 112 in return receives the session state and the contextual information of the session state 414 and saves the session state and the contextual information for later retrieval at block 416. In the case that no predetermined event has occurred, the client device keeps checking at block 410 until the check is positive for occurrence of a second predetermined event.

In one or more implementations, if the predetermined event for example is detecting inactivity for a predetermined threshold time period for one or more of the applications running on the system, a comparison between the first session state and the second session state may be needed before sending the second session state to the server 112. This comparison may be needed to verify if there is any change between the second state and the first state that necessitate sending the second session state. For example, a change between the first session state and the second session state may be detected as a change in state information of the device, as in detecting a change in window locations, a change in scrawling bars for web applications, or the change of the DOM of a running web application. The change between the first session state and the second session state may be the start of a new application in the second session state that was not open during the first session state.

In some example aspects and at a subsequent time, the client device (e.g., any of 102-106) requests a prior session state (e.g., so as to resume a prior session that the user was engaged in), at block 440, from the server 112. At block 442, the server 112 retrieves the contextual information about the state sessions that are saved related to the client device or a user account, and sends the contextual information to the client device at block 444. The client device (e.g., any of 102-106) receives the contextual information at block 446 and provides the user with an interface for all session states based on different contextual information. For example, the presented contextual information can include different parameters as indicated in FIG. 3. The user interface provides the user an option to select the desired session state based on the contextual information of the session state at block 448. The client device requests the selected session state for retrieval from the server 112 at block 450. The server 112 retrieves the requested session as at block 452 and sends the requested session state at block 454 to the client device which in return receives the requested session state at block 456 for display and use.

FIG. 5 conceptually illustrates a computing system 500 with which implementations of the subject technology, such as server 112 and wireless client device (e.g., any of 102-106), may be implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processor 512, a system memory 504, a read-only memory (ROM) 510, a permanent storage device 502, an input device interface 514, an output device interface 506, and a network interface 516.

Bus 508 collectively represents system, peripheral, and chipset buses that communicatively connect the numerous internal devices of electronic system 500. For instance, bus 608 communicatively connects processor 512 with ROM 510, system memory 504, and permanent storage device 502.

From these various memory units, processor 512 retrieves instructions to execute and data to process in order to execute the processes of the subject disclosure. The processor can be a single processor or a multi-core processor in different implementations.

ROM 510 stores static data and instructions that are needed by processor 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for processing session state information according to various implementations. From these various memory units, processor 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A system for providing state information to a server, the system comprising:
   one or more processors; and
   a machine-readable medium comprising instructions stored therein, which when executed by the processors, cause the processors to perform operations comprising:
   accessing a document object model (DOM) for a web application, the DOM corresponding to a tree structure which represents a first state of the web application;
   providing, to a server, an indication of the first state of the web application based on the DOM;
   calculating a delta between the first state of the web application and a second state of the web application, the second state of the web application being different than the first state of the web application;
   determining that the second state of the web application is to be provided to the server when the calculated delta satisfies a threshold and at least a threshold amount of time has elapsed from providing the indication of the first state of the web application to the server;
   providing, to the server and in response to the determination, an indication of the second state of the web application, corresponding to an updated version of the DOM;
   sending, to the server, a request to retrieve the first state of the web application that was provided to the server prior to providing, to the server, the second state of the web application;
   receiving, from the server and in response to the sending, DOM information corresponding to the first state of the web application; and
   restoring the first state of the web application based at least in part on the received DOM information corresponding to the first state of the web application.

2. The system of claim 1, the operations further comprising:
   determining state information of the system, the state information comprising at least one of window location data, scrolling position data, folder creation data, application position data, open window information, minimized window information, and display settings information; and
   providing, to the server, an indication of the determined state information, for subsequent retrieval from the server.

3. The system of claim 1, wherein the DOM information comprises an entirety of the updated version of the DOM, generated at the server using the indication of the second state of the web application.

4. The system of claim 1, wherein the DOM corresponds to a current javascript state of the web application.

5. The system of claim 1, wherein the DOM is accessed from RAM of the system.

6. The system of claim 1, wherein the indication of the first state provided to the server corresponds to an entirety of the DOM.

7. The system of claim 1, wherein calculating the delta between the first state of the web application and the second state of the web application comprises:
   calculating the delta between the DOM corresponding to the tree structure which represents the first state of the web application and another DOM corresponding to another tree structure which represents the second state of the web application.

8. The system of claim 1, wherein providing the indication of the second state comprises providing the calculated delta to the server.

9. The system of claim 1, wherein determining that the second state of the web application is to be provided to the server comprises:
   determining a level of network resource availability for the system; and
   determining that the second state of the web application is to be provided to the server when the calculated delta satisfies the threshold and the at least the threshold amount of time has elapsed from providing the indication of the first state of the web application, and the determined level of network resource availability is below a threshold availability level.

10. The system of claim 1, wherein the server is a synchronization server for synchronizing sessions of the web application for the system.

11. The system of claim 1, wherein the web application is a webpage accessed from a web server.

12. A machine-readable medium comprising instructions stored therein, which when executed by a system, cause the system to perform operations comprising:
   accessing a document object model (DOM) for a web application, the DOM corresponding to a tree structure which represents a first state of the web application;
   providing, to a server, an indication of the first state of the web application based on the DOM;
   calculating a delta between the first state of the web application and a second state of the web application, the second state of the web application being different than the first state of the web application;
   determining that the second state of the web application is to be provided to the server when the calculated delta satisfies a threshold and at least a threshold amount of time has elapsed from providing the indication of the first state of the web application to the server;
   providing, to the server and in response to the determination, an indication of the second state of the web application, corresponding to an updated version of the DOM;
   determining state information of the system, the state information comprising at least one of window location data, scrolling position data, folder creation data, application position data, open window information, minimized window information, and display settings information; and
   providing, to the server, an indication of the determined state information, for subsequent retrieval from the server.

13. The machine-readable medium of claim 12, wherein the instructions, when executed by the system, cause the system to perform further operations comprising:
   sending, to the server, a request to retrieve the first state or the second state of the web application;
   receiving, from the server, the first state or the second state of the web application based on the request; and
   restoring the received first or second state of the web application.

14. The machine-readable medium of claim 12, wherein calculating the delta between the first state of the web application and the second state of the web application comprises:
calculating the delta between the DOM corresponding to the tree structure which represents the first state of the web application and the updated version of the DOM corresponding to the second state of the web application.

15. A system for providing session states to a server, the system comprising:
one or more processors; and
a machine-readable medium comprising instructions stored therein, which when executed by the processors, cause the processors to perform operations comprising:
determining that a predetermined event has occurred with respect to one or more applications running on the system, the predetermined event indicating that a first session state for the one or more applications is to be provided to the server;
sending, to the server, and in response to determining that the predetermined event has occurred, the first session state for the one or more applications;
calculating a delta between the first session state for the one or more applications and a second session state for the one or more applications, the second session state being different than the first session state;
determining that the second session state for the one or more applications is to be provided to the server when the calculated delta satisfies a threshold and at least a threshold amount of time has elapsed from providing the first session state to the server;
sending, to the server and in response to determining that the second session state for the one or more applications is to be provided to the server, the second session state for the one or more applications; and
providing, to the server, contextual information for each of the first session state and the second session state, the contextual information for providing a user with context to differentiate the first session state from the second session state.

16. The system of claim 15, wherein the contextual information comprises a screenshot for each of the first session state and the second session state.

17. The system of claim 15, wherein the contextual information comprises a session end time for each of the first session state and the second session state.

18. The system of claim 15, wherein the contextual information comprises an indication of web resources being accessed for each of the first session state and the second session state.

19. The system of claim 15, wherein determining that the predetermined event has occurred comprises at least one of: detecting that the user logged out of the system or out of at least one of the one or more applications, detecting login as a different user with respect to the system or at least one of the one or more applications, detecting inactivity for a predetermined threshold time with respect to the system or at least one of the one or more applications, detecting a new type of activity with respect to the system or at least one of the one or more applications, or detecting a switch to a different session.

20. The system of claim 15, the operations further comprising:
sending, to the server, a request to retrieve a prior session;
receiving, from the server and in response to the sending, the contextual information for the first session state and the second session state;
receiving, in response to the received contextual information, user selection of the first session state or the second session state;
receiving, from the server, the first session state or the second session state based on the received user selection; and
restoring the received first or second session state.

21. A machine-readable medium comprising instructions stored therein, which when executed by a system, cause the system to perform operations comprising:
determining that a first predetermined event has occurred with respect to one or more applications running on the system, the first predetermined event indicating that a first session state for the one or more applications is to be provided to a server;
sending, to the server, and in response to determining that the first predetermined event has occurred, the first session state for the one or more applications;
calculating a delta between the first session state for the one or more applications and a second session state for the one or more applications, the second session state being different than the first session state;
determining that the second session state for the one or more applications is to be provided to the server when the calculated delta satisfies a threshold and at least a threshold amount of time has elapsed from providing the first session state to the server;
sending, to the server and in response to determining that the second session state for the one or more applications is to be provided to the server the second session state for the one or more applications;
providing, to the server, contextual information for each of the first session state and the second session state, the contextual information for providing a user with context to differentiate the first session state from the second session state;
sending, to the server, a request to retrieve a prior session;
receiving, from the server and in response to the sending, the contextual information for the first session state and the second session state;
receiving, in response to the received contextual information, user selection of the first session state or the second session state;
receiving, from the server, the first session state or the second session state based on the received user selection; and
restoring the received first or second session state.

* * * * *